Oct. 26, 1965  A. MAGLICA  3,213,722
MACHINE TOOL DEVICE

Filed Sept. 16, 1960  3 Sheets-Sheet 1

INVENTOR.
ANTHONY MAGLICA
BY Edward O. Ansell
ATTORNEY

INVENTOR.
ANTHONY MAGLICKA
BY Edward D. Ansell
ATTORNEY

Oct. 26, 1965　　　A. MAGLICA　　　3,213,722
MACHINE TOOL DEVICE
Filed Sept. 16, 1960　　　3 Sheets-Sheet 3

INVENTOR.
ANTHONY MAGLICA
BY Edward T. Ansell
ATTORNEY

United States Patent Office 3,213,722
Patented Oct. 26, 1965

3,213,722
MACHINE TOOL DEVICE
Anthony Maglica, 915 Somerset Ave., Pomona, Calif.
Filed Sept. 16, 1960, Ser. No. 56,426
2 Claims. (Cl. 82—36)

This invention relates to toolholders for machine tools in general, and to a device adapted to receive a plurality of toolholders in particular.

As used hereinafter, a toolholder shall be understood to mean a device for holding a cutting tool in a definite position with respect to the tool slide of a machine tool, such as a lathe. Cutting tools shall be understood to include any of the lathe tools well known to those skilled in the art, such as cut-off tools, threading tools, facing tools, and form tools, the latter being a type of cutting tool intended to produce a desired contour on a workpiece by means of a turning operation.

There are a number of important considerations in operating machine tools on a profitable basis and two of the most important are set-up time and accuracy. Although a cost-per-piece analysis reveals that this factor is relatively unimportant on a long-run job, it is obvious that the time required to arrange the various tools in working relation to the workpiece, i.e., set-up time, is a critical factor on smaller lot sizes. Where the set-up must be disassembled, and reassembled for succeeding operations on a workpiece, it is often found that the concentricity of the work piece is lost. Devices for holding a plurality of toolholders, such as turrets, avoid the necessity of tearing down and setting up the work assembly for each operation and are well known in the art. However, known devices have a limited capacity and serious problems have been encountered with regard to their accuracy. For example, often each cutting tool in a device holding a plurality of toolholders does not accurately align with the cuts made on a workpiece by a previous tool or tools mounted in the device. Alternatively, a particular tool may not engage each member of a plurality of work pieces at exactly the same position on each piece during a production run. As a result, work pieces within a particular run, or within a number of runs, may not be identical within acceptable tolerance, thus defeating the goal of achieving mass production of interchangeable parts. As set forth at Section 22-5, "Accuracy and Tolerances," of Tool Engineers Handbook, second edition, American Society of Tool Engineers, McGraw-Hill Book Co., Inc., New York. N.Y., 1959 the accuracy of machine tools using toolholders known in the prior art is depending upon the condition of the machine, machine alignment, the foundation and operator skill. Particular attention must be given to the wear on the turret-locating mechanism which often comprises indexing or locating pins. Such mechanisms for selectively determining and arranging the proper tool for a particular operation in a device for holding a plurality of toolholders are often complex and cumbersome, requiring a considerable amount of operation time and skill to remove one tool and set the next into place. Further, such devices are often expensive to produce and are therefore costly to purchase. Many known devices of this type do not firmly hold toolholders and cutting tools to the extent required by the close tolerances presently practiced in the fabrication of components for missile and weapons systems.

It is therefore the principal object of the present invention to provide a novel method of and improved means for providing a plurality of cutting toolholders within a single receiving means which may be quickly and simply selectively manipulated at the operator's discretion.

Another object of the present invention is to provide a novel method of and improved means for providing a plurality of tools for several and varied operations on workpieces, whereby the concentricity of the workpieces is maintained.

Still another object of the present invention is to provide a novel method of and improved means for subjecting a plurality of workpieces to multiple operations by a plurality of cutting tools whereby the accuracy of the cuts on each workpiece and the dimensions of one workpiece are virtually identical to those of any other workpiece in said plurality.

Yet another object of this invention is to provide a novel device of unique design for receiving a plurality of cutting tools which is inexpensive to produce, and which is simple, fast, and highly accurate in operation.

And another object of this invention is to provide a novel method of and improved means for rigidly holding a plurality of toolholders within a single device.

And still another object is to provide improved means for holding a cutting tool within a tool holder.

In its principal aspect, the present invention comprises a device having a plurality of uniquely formed receptacles adapted to receive a plurality of toolholders on a tool table, the tool table being connected to a piston. The piston is arranged within a cylinder body to form an expansion chamber therewith. Resilient means are positioned between a baseplate upon which the device is mounted and the surface of the piston opposite the expansion chamber. The under surface of the tool table and the top surface of the cylinder body have unique mating means. When a pressure fluid is introduced into the expansion chamber, the axial movement of the piston against the resilient means moves the tool table into rigid engagement with the cylinder body. The tool table, cylinder body and piston together form a rigid unitary structure, thereby positioning a selected toolholder and tool in operative relation to the workpiece. When it is desired to change the tool, the pressure fluid is exhausted from the expansion chamber and the resilient means force the piston in the opposite axial direction, thereby freeing the tool table from engagement with the cylinder body, whereby the tool table may now be rotated by hand by the operator to the position wherein the desired toolholder and tool are operatively related to the workpiece for the next operation. Pressure fluid is again introduced into the expansion chamber as described before beginning the next operation.

A particular feature of the present invention is the unique mating means which insures that any particular tool is accurately aligned and positioned with respect to any other tool and to any workpiece to provide dependable reproducibility of results. Another feature of this invention is the unique means for rigidly seating each tool within a novel toolholder adapted for use with the device of the present invention.

The above and other objects, aspects, features and advantages of the present invention will become apparent by reading the following more detailed description and appended claims together with the accompanying drawings, wherein:

FIGURE 7b is a section view of the novel toolholder taken along section line C—C of FIGURE 7a.

Figure 1:
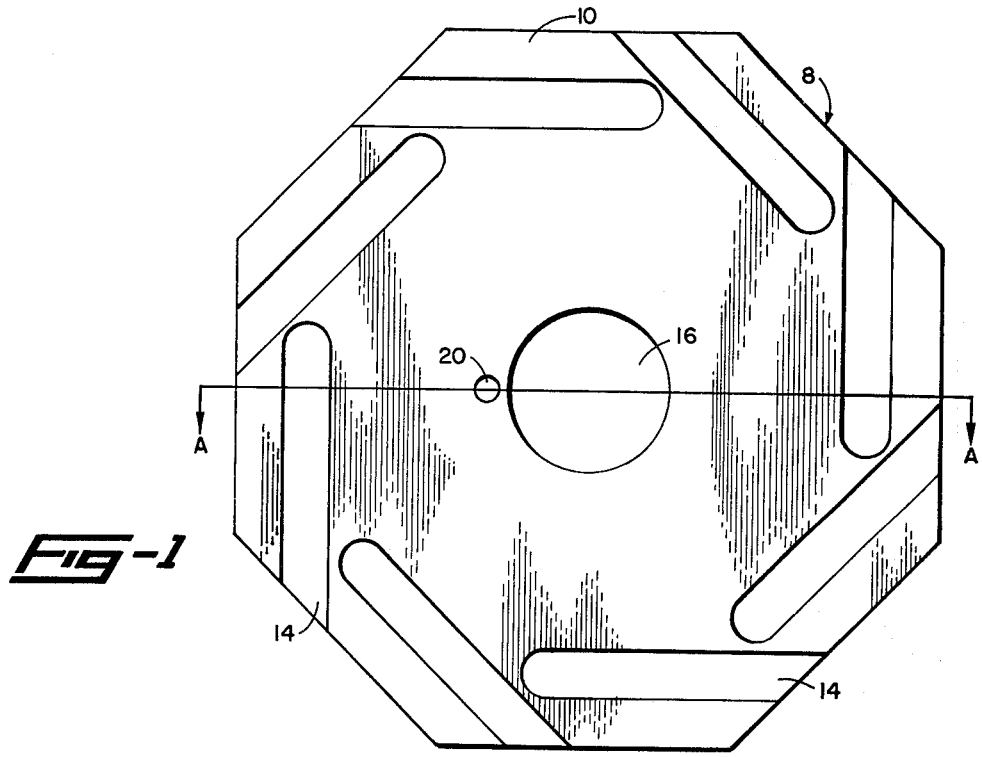
FIGURE 1 is a plan view of the device of the present invention.

Reference is made to FIGURE 1 which is a plan view of the toolholder receiving device of the present invention. The top surface 10 of the tool table 8 is seen to have a plurality of receptacles 14 adapted to receive toolholders. The table 8 is shown here to be octagonal in shape, receiving eight toolholders which carry tools adapted to perform different cutting operations. The table 8 will generally be polygonal in shape, but this invention is not to be limited to any particular number of toothholder positions or geometric configuration of the tool table. Centrally located on the tool table top surface 10 is a dust cover 16 which keeps the central mechanism hereinafter described free from dust, dirt and grease, and provides a means of central access to the mechanism for purposes of assembly, inspection and repair.

Figure 2:
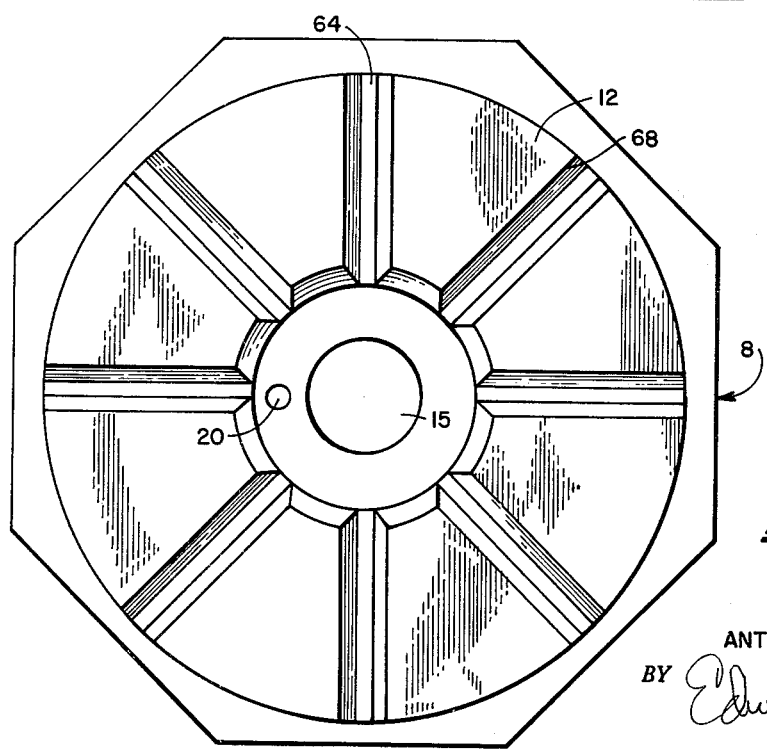
FIGURE 2 is a view of the bottom surface of the tool table.
Figure 3:
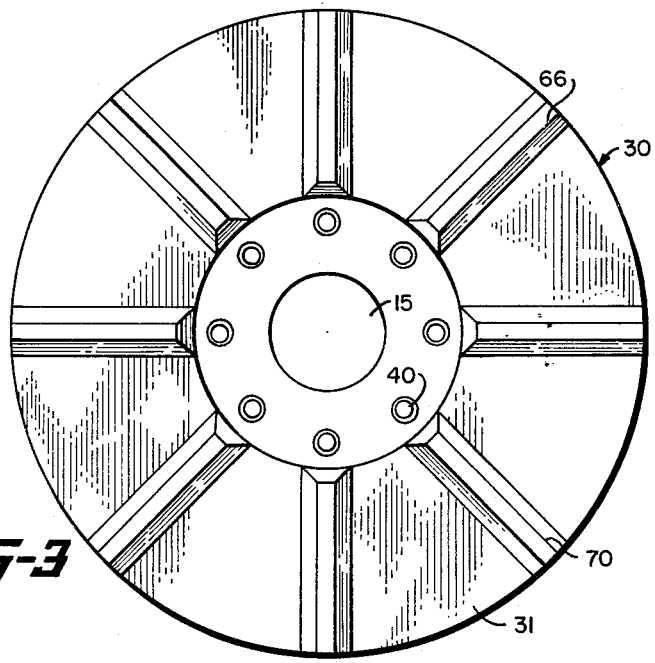
FIGURE 3 is a plan view of the cylinder body member.

FIGURE 2 is a view of the undersurface of the tool table 8. A hole 20 is provided for preliminary indexing means to be later described. FIGURE 3 shows the complementary top surface 31 of the cylinder body 30. Centrally located are a plurality of countersunk holes 40 for the preliminary indexing member which have an equal angular position. The central passageway 15 is shown on both views. The unique mating and alignment means 64, 68 of the tool table undersurface 12, and the complementary mating and alignment means 66, 70 of the cylinder body top surface 31 will be explained in more detail in connection with FIGURE 6, after first considering the general construction and operation of the device.

Figure 4:
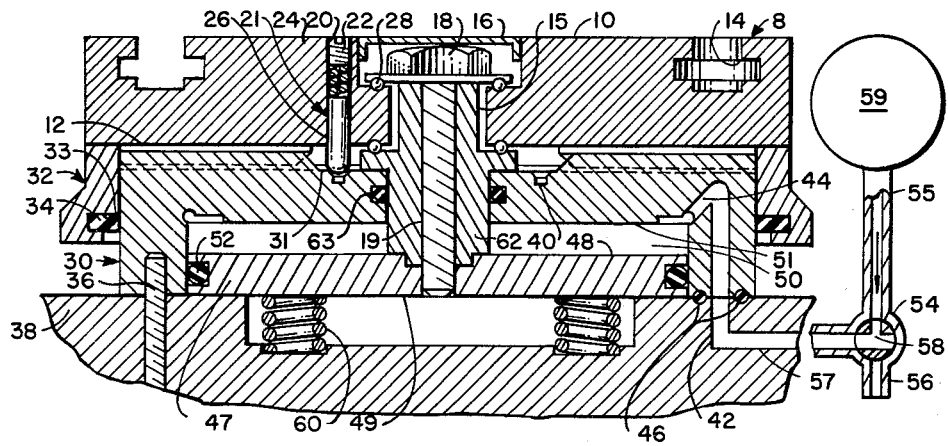
FIGURE 4 is a section view of the entire device of the present invention in the engaged position taken along section line A—A of FIG. 1.
Figure 5:
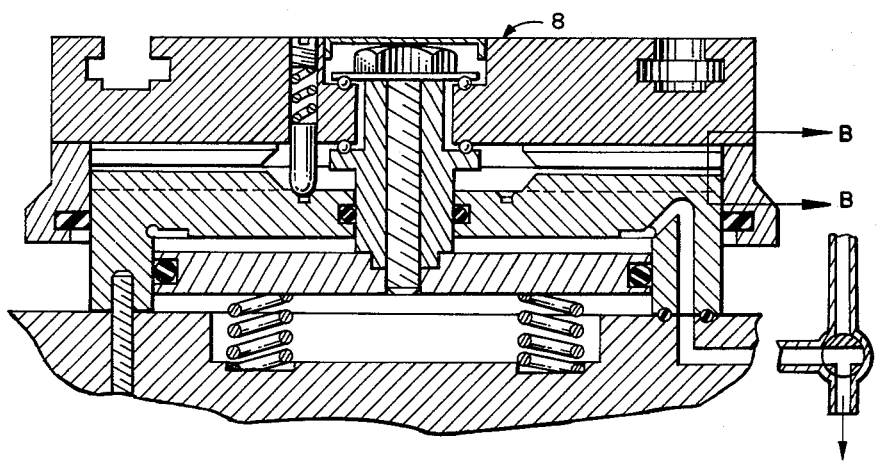
FIGURE 5 is a section view in the disengaged or free position taken along section line A—A of FIG. 1.

The principal components of the device of the present invention are illustrated in FIGS. 4 and 5. A tool table 8 is joined to a piston 47 which is arranged within a cylinder body 30. The body 30 is held to a baseplate 38 by bolt means 36, which may be mounted on the machine tool, tool slide. Resilient means 60 are fitted between the lower piston surface 49 and the baseplate 38.

The tool table 8 has a plurality of receptacles 14 cut within the upper surface 10 and body which receive toolholders carrying cutting tools of the various types described. A central passageway 15 is cut from the tool table 8 to receive a retaining stud 19 threaded within an inserted core bushing 62, and into the piston 47 through its top surface 48. A collar nut 18 is threaded on the top end of the stud 19, a ball bearing assembly 28 being fitted around the core bushing 62 and beneath the collar nut 18, to allow free rotation of the tool table 8 when the device is in the disengaged position as hereinafter described. A dust plate 16 snaps into the central passage cavity 15 in the tool table top surface 10 to keep out contaminants and allow access for assembly, inspection, and repair. A hole 20 for preliminary indexing guide member 21 is placed near the central passageway 15. The indexing guide member 21 is shown here to be of the spring plunger type and is a standard commercial item. As utilized in the present invention, it comprises a screw 22, inserted flush with the table top surface 10, which in turn compresses a spring 24 to force an indexing pin 26 to seat in any indexing member hole 40 which is counter-sunk in the top surface 31 of the cylinder body 30.

The stud 19 threads into the piston 47 which is fitted within a cylinder body 30. An expansion chamber 50 is formed by the inner surface 51 of the cylinder body 30 and the upper surface 48 of the piston 47. A fluid pressure passageway 44 is arranged within the body 30 and provides communication between the expansion chamber 50 and a source of pressure fluid 59 via a baseplate pressure fluid conduit 42, which connects to the pressure fluid supply through a three-way fluid valve 54 having an inlet port 55, and exit port 57 and an overboard or dump or exhaust port 56, such valves being well known in the art. To keep the structure pressure-tight, seal rings 46 are provided at the junction between the baseplate conduit 42 and the body passageway 44, and an O-ring 52 is provided on the piston 47 to make a pressure seal with the cylinder body 30. Sealing ring means 63 are provided around the core bushing 62 to provide a pressure-tight seal.

Resilient means 60 are fitted in a recess in the base plate 38, and snugly abut the bottom surface 49 of the piston 47. Although two springs are illustrated here, the resilient means 60 can comprise any convenient number which will fit into the space provided and be of sufficient resilience to perform in the manner required. A wiper assembly 32 is shrunk-fit or pressed on the tool table 8 at an inner recess 33, a contact member 34 of flexible material such as felt or rubber being fitted in the inner surface of the wiper assembly 32 to bear against the outer periphery of the cylinder body 30. The function of the assembly 32 is to insure accurate alignment of the axial travel of the tool table 8 by riding up and down the outer surface of the body 30 as the device moves from the engaged to the disengeged position, and vice-versa.

Figure 6:
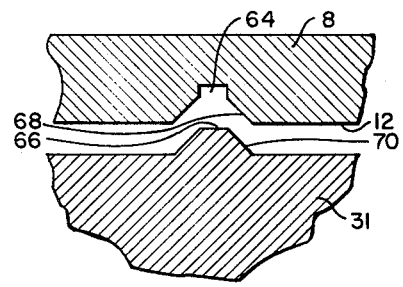
FIGURE 6 is an enlarged section view of the novel alignment and indexing means of the present invention taken along section line B—B of FIGURE 5.

FIGS. 2, 3 and 6 show the novel alignment feature of the present invention which insures continued accuracy of operations despite inevitable wear of the surfaces of the device over extended periods of operation. The bottom surface 12 of the tool table 8 is provided with a plurality of female grooves 64 which are seen to have beveled sides 68 which are cut at substantially 45°, the grooves being arranged at an equal angular distance around the surface 12. Similarly, the top surface 31 of the cylinder body 30 has an equal number of complementary and similarly spaced male appendages 66, having beveled side faces 70 of substantially 45°. The angular cut of the groove surfaces 68 and the appendage surfaces 70 must be identical. Although the device will be operative with angles close to 45°, it has ben found that by use of the configuration described, the tool table will remain in accurate alignment, inasmuch as the appendage surfaces 70 will continue to accurately seat in the table grooves 68 irrespective of wear. Alignment means known in the prior art often employ only indexing pins which are subject to considerable wear. A slight amount of wear on the indexing pin results in intolerable inaccuracy in the workpiece. Therefore, the use of complementary appendages and grooves which remain accurate irrespective of wear, together with the spring loaded preliminary indexing means 21, form an important feature of this invention.

To operate the device of this invention, the central plug 58 of the three-way valve 54 is set in a manner permitting communication between the inlet port 55 and the exit port 57. Pressure fluid then will flow from the source 59 through the valve 54, into the base plate fluid conduit 42 and body passageway 44 into the expansion chamber 50. Presence of pressure fluid within the chamber 50 will drive the piston 47 in a downward axial direction until it meets the baseplate 38. This engaged position is shown in FIG. 4, the novel alignment means, i.e., the appendages 66 and the grooves 64, being in locked position. The operator can proceed to machine the workpiece as desired with the cutting tool selected.

To release the tool table 8 from the previously selected position, the operator turns the central plug 58 of the three-way valve 54 to the position whereby a passageway is formed between the exit port 57 and the overboard or exhaust port 56. The pressure fluid is then discharged from the expansion chamber and the resilient means 60, which were compressed by the downward movement of the piston 47, drive the piston upward in an axial direction, thereby lifting the tool table alignment grooves 64 off the cylinder body appendages 70, as shown in FIG. 5. In actual practice, the clearance is on the order of .100 inch, but this is not critical. In this position, the tool table 8 may be quickly moved by hand on the bearing assembly 28 to any new position selected by the operator. The indexing means 21 will insure that the alignment means will seat properly when the device is actuated by introduction of pressure fluid in the manner previously described.

Figure 7B:
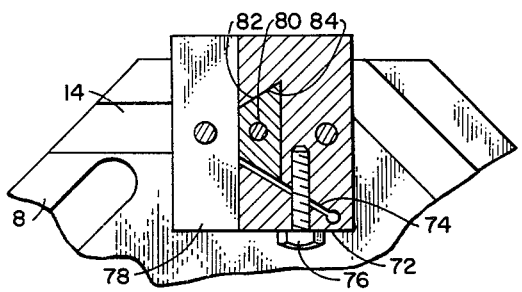
Figure 7A:
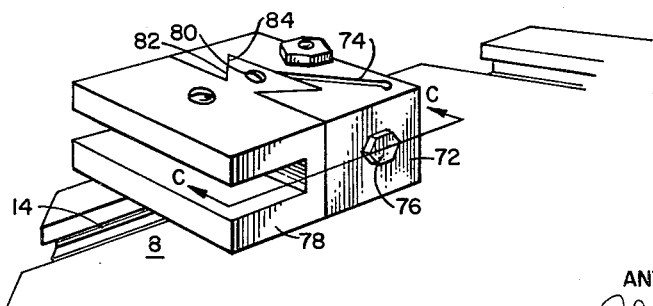
FIGURE 7a is a perspective view of a novel toolholder inserted in the tool table of the present invention.

Reference is made to FIGS. 7a and 7b which show the novel toolholder inserted into the tool table of the present invention. A toolholder 71 having a bottom appendage (not shown) is inserted in the receptacle 14 of the tool table 8. The toolholder 71 comprises a master block 72 having a dovetail indentation 82 cut in one lateral surface thereof. A groove 74 is cut at an oblique angle from the indentation 82 toward a corner of the block 72, and a capscrew 76 is threaded through the block 72 and indentation 82. A toolholding member 78 having a dovetail appendage 84 seats in the block groove 82. A vertical adjusting screw 80 is provided to set the height of the tool. In operation, the desired tool is inserted into the toolholding member 78, the appendage 84 of which is inserted in the block indentation 82, and the capscrew tightened to secure a solid mounting. The toolholder 71 described, when used with the device adapted to hold a plurality of toolholders previously described, provides a machine tool fixture of superior accuracy.

What has been described is a novel machine tool device for positioning a plurality of toolholders with respect to a workpiece. Features of the machine include simplicity of construction and ease of operation as well as superior accuracy. It is to be understood that the forms of the invention herewith shown and described are to be taken as preferred examples of the same, and that various changes in the shape, size and arrangement of the parts may be resorted to without departing from the spirit of the invention and scope of the claims.

What is claimed is:

1. A device comprising: a rotatable tool table adapted to receive a plurality of toolholders containing tool bits on the top surface of the table, said table having locking means on the bottom surface thereof which comprise a plurality of indented grooves extending radially from the central axis of said table, the walls of said grooves making an angle of substantially 45 degrees with said bottom surface; a piston connected in extended relationship in a direction perpendicular to said tool table; a cylindrical member having a closure at one end, said member engaging the periphery of said piston to form an expansion chamber enclosed by said closed cylinder end and a first surface of said piston, said member having a passageway in the wall thereof adapted to receive pressure fluid and communicating with said expansion chamber, said member having locking means on the outer surface of said closure comprising a plurality of vertical appendages extending radially from the central axis of said cylindrical member, the lateral surfaces of said appendages making an angle of substantially 45 degrees with said outer surface of said closure, said appendages being equal in number to said plurality of grooves in said tool table bottom surfaces, and being of a size and location whereby they may seat in said grooves; the top surface of said closure having a plurality of depressions thereon which are equal in number to the toolholders to be held in said tool table, said depressions being centrally located and being in equal angular relation to each other; an indexing guide member mounted in said tool table and extending downwardly to engage any one of said plurality of depressions in the top surface of said closure; spring means engaging a second surface of said piston; means arranged on the lower periphery of said tool table which are in spaced relation to the outer periphery of said cylindrical member; flexible means connected to said spaced means and in wiping relation with said cylindrical member; whereby introduction of pressure fluid to said passageway and said expansion chamber after engagement of said indexing guide member in one of said plurality of depressions will move said piston in an axial direction to compress said spring means, thereby causing engagement of said grooves on said appendages to lock said table on said cylindrical member in a non-rotatable position, and release of pressure fluid from said expansion chamber and passageway will cause said spring means to force said piston in an opposite axial direction, thereby removing said grooves from said appendages and placing said table in a rotatable position free from said cylindrical member, said spaced means on the lower periphery of the tool table and said flexible means riding along the periphery of said table and cylindrical body member respectively as the tool table is engaged in the locked or unlocked position.

2. An indexable table, comprising:
    (a) a rotatable table member adapted to receive tool bits;
    (b) a piston connected to said table member;
    (c) a cylinder body engaging the periphery of said piston, the cylinder body being closed at the end nearest said member, said cylinder closure and said piston together forming an expansion chamber, and said cylinder body having a passageway therein communicating with said expansion chamber, said passageway and said expansion chamber being adapted to receive pressure fluid;
    (d) resilient means engaging said piston at the end opposite said cylinder closure;
    (e) a biased indexing guide member spaced apart from said vertical axis, said guide member being arranged on the bottom surface of said table member and extending outwardly therefrom;
    (f) a plurality of equispaced indented grooves extending radially outwardly from the vertical axis of said table member on the bottom surface thereof, said grooves commencing beyond said indexing guide and extending to the vicinity of the outer periphery of said table member, said grooves having walls making an angle of substantially 45° with said bottom surface;
    (g) the top surface of said cylinder body having a plurality of depressions thereon which are equal in number to the tool cutting positions to be assumed by said rotatable table member, said depressions being spaced apart from said vertical axis in equal angular relationship to each other, and arranged to be engaged by said indexing guide member; and
    (h) a plurality of equispaced vertical appendages arranged on the top surface of said cylinder body, said appendages commencing beyond said depressions and extending radially outward to the vicinity of the outer periphery of said cylinder body, said appendages having lateral surfaces which make an angle of substantially 45° with the top of said cylinder body.

References Cited by the Examiner

UNITED STATES PATENTS

| | | | |
|---|---|---|---|
| 1,143,252 | 6/15 | Conradson | 29—35.5 |
| 2,875,662 | 3/59 | Poorman | 82—36 |
| 2,892,370 | 6/59 | Waldrich | 82—36 |
| 2,952,169 | 9/60 | Johnson | 74—822 |
| 2,956,452 | 10/60 | Bever | 74—822 |
| 3,049,032 | 8/62 | Schobot | 74—826 XR |

FOREIGN PATENTS

| | | |
|---|---|---|
| 353,820 | 5/22 | Germany. |
| 1,023,293 | 1/58 | Germany. |
| 490,995 | 2/54 | Italy. |

ANDREW R. JUHASZ, *Primary Examiner.*

RICHARD H. EANES, JR., WILLIAM W. DYER, JR., *Examiners.*